Patented Aug. 30, 1938

2,128,605

UNITED STATES PATENT OFFICE 2,128,605

INVERTASE SOLUTION

Edward Romer Dawson, Epsom, England, assignor to The Distillers Company Limited, Edinburgh, Scotland, a British company No Drawing. Application April 15, 1938, Serial No. 202,353

2 Claims. (Cl. 195—63)

The present invention relates to the production of invertase solutions which can be stored without deterioration and which even when exposed to accidental contact with mould spores and the like will not permit such organisms to develop.

As invertase solutions are used primarily for preparing products for edible purposes, it is undesirable that antiseptics should be added to the solutions. It has already been proposed to stabilize invertase solutions by adding thereto polyhydric alcohols, particularly glycerol, but relatively large amounts, for example, about 50 per cent of such compounds are required to produce the desired effect and the potency of the invertase solutions is thereby reduced.

I have now found that diacetin possesses the property of preventing the growth of organisms in invertase solutions even if such solutions become accidentally contaminated, and that it maintains the invertase solutions in perfect condition for an indefinite period.

Diacetin has the advantage that it is non-toxic, tasteless and without odor, and is efficacious when used to the extent of only 25 per cent to 30 per cent by weight of the invertase preparation.

What I claim is:—

1. A new composition of matter comprising essentially invertase solution and a stabilizing component in the form of diacetin.

2. A new composition of matter consisting of invertase solution and diacetin the latter constituting not more than 30 per cent by weight of the composition.

EDWARD ROMER DAWSON.